United States Patent [19]

Pone et al.

[11] 4,264,197
[45] Apr. 28, 1981

[54] PHOTOGRAPHIC REPRINT SYSTEM WITH DUAL INDICIA SENSOR FOR SYNCHRONIZATION RECOVERY

[75] Inventors: Janis Pone, Minneapolis; Ronald C. Laska, Minnetonka, both of Minn.

[73] Assignee: Pako Corporation, Minneapolis, Minn.

[21] Appl. No.: 109,823

[22] Filed: Jan. 4, 1980

Related U.S. Application Data

[63] Continuation-in-part of Ser. No. 23,521, Mar. 23, 1979, abandoned.

[51] Int. Cl.³ .................................................... G03B 27/52
[52] U.S. Cl. ....................................... 355/41; 355/50; 355/112
[58] Field of Search ................. 355/41, 14 R, 14 C, 355/14 CU, 38, 40, 50, 51, 45, 97, 112; 250/548, 566, 571

[56] References Cited

U.S. PATENT DOCUMENTS

| | | |
|---|---|---|
| 3,267,800 | 8/1966 | Baillod .................................... 355/41 |
| 3,290,987 | 12/1966 | James et al. ........................ 355/41 X |
| 3,353,441 | 11/1967 | Jonker ................................... 355/41 |
| 3,447,871 | 6/1969 | Neale .................................... 355/18 |
| 3,888,580 | 6/1975 | Amano et al. ......................... 355/38 |
| 3,898,002 | 8/1975 | Kinder et al. ...................... 355/41 X |
| 3,947,110 | 3/1976 | Yamada ................................. 355/38 |
| 3,950,652 | 4/1976 | Yamashita ........................ 355/41 X |
| 4,128,330 | 12/1978 | Fergg et al. ....................... 355/40 X |
| 4,150,894 | 4/1979 | Meyer et al. .......................... 355/38 |

*Primary Examiner*—Richard A. Wintercorn
*Attorney, Agent, or Firm*—Kinney, Lange, Braddock, Westman and Fairbairn

[57] ABSTRACT

A photographic reprint system includes a preparation station at which film segments or strips are attached to an elongated tab. Indicia (typically in the form of holes) are formed in the tab to indicate the location of each film frame, to signify the end of the film segment, the end of a customer order, and the end of a reel. Information relating to the printing of each film frame, including the number of holes in the tab adjacent that frame, is stored in a storage medium such as a floppy disk. At a photographic printer, the tab and attached film segments are advanced sequentially to a print gate, where printing occurs based upon the data which is sequentially retrieved from the storage medium. A first hole sensor located upstream of the print gate counts the number of holes in the tab as each frame is advanced to the print gate, and this number is compared with the stored number which has been retrieved from the storage medium. Even if the numbers disagree, however, the film frame is still printed, but the number of holes is also counted by a second hole sensor adjacent the print gate. If the number of holes sensed by the second sensor also disagrees with the stored number, further operation of the printer is inhibited and the operator is required to resynchronize the system. If, on the other hand, the number of holes sensed by the second hole sensor agrees with the stored number, operation of the printer is permitted to continue without interruption.

10 Claims, 11 Drawing Figures

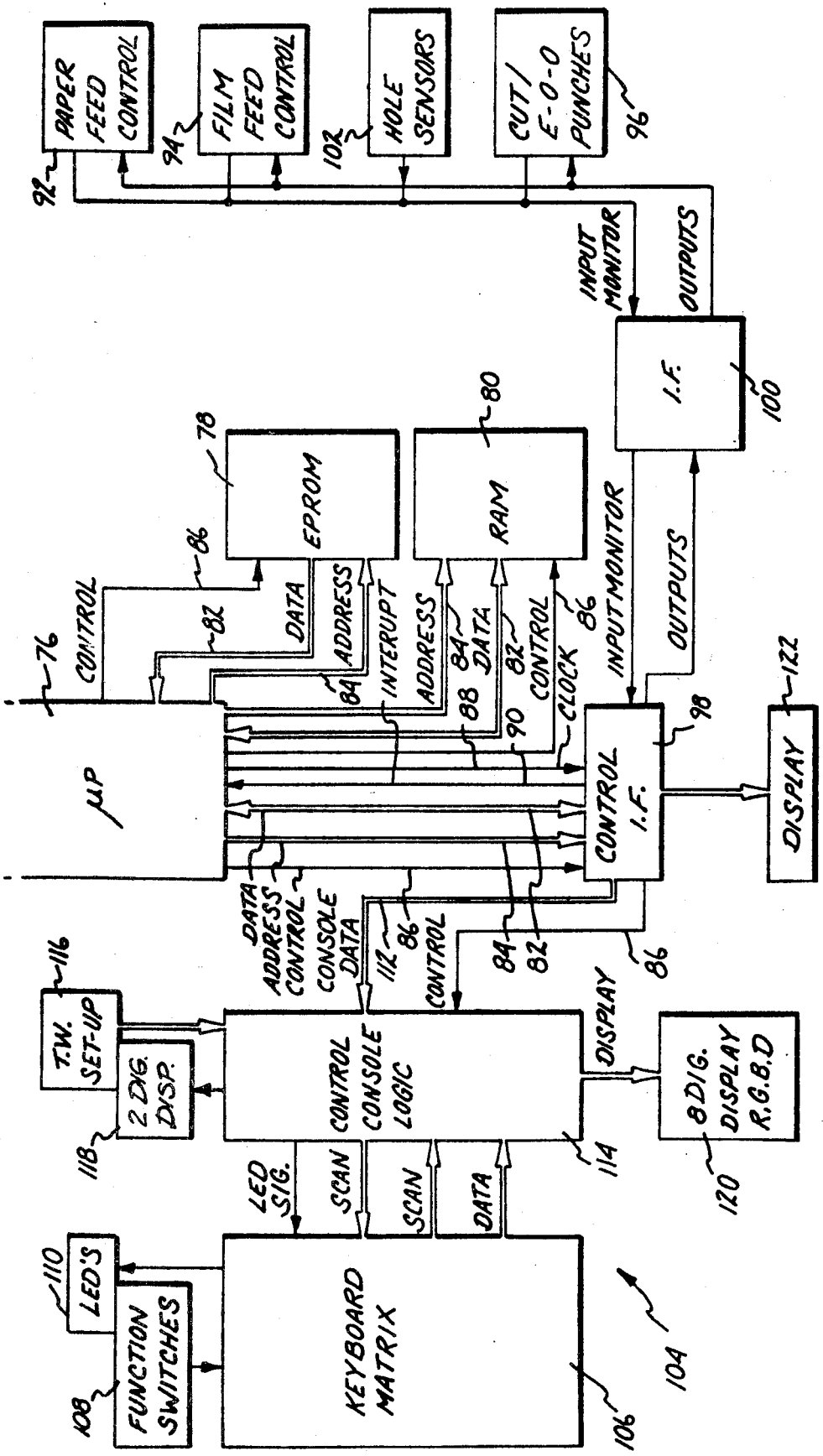

PHOTOGRAPHIC REPRINT SYSTEM WITH DUAL INDICIA SENSOR FOR SYNCHRONIZATION RECOVERY

REFERENCE TO CO-PENDING APPLICATIONS

The present application is a continuation-in-part of U.S. patent application Ser. No. 023,521, filed Mar. 23, 1979 by Ronald B. Harvey, Janis Pone, Ronald C. Laska and Francis M. Laciak now abandoned, which is assigned to the same assignee as the present application.

Reference is also made to the following U.S. patent applications, all of which are assigned to the same assignee as the present application, are filed on even date with this application, and are continuations-in-part of the above-mentioned application Serial No. 023,521: Ser. No. 109,824, entitled "Photographic Reprint System with Film Size Code Comparison"; Ser. No. 109,822, entitled "Photographic Reprint System with Reprint Neghold Indication", Ser. No. 109,821 entitled "Photographic Reprint System with Large Print Quantity Verification", and Ser. No. 109,825 entitled "Photographic Reprint System with Information Display".

BACKGROUND OF THE INVENTION

1. Field of the Invention

The present invention relates to photographic printing systems. In particular, the present invention is a photographic reprint system in which dual indicia sensors are used to check for synchronization errors between the tabbed photographic film and the data being supplied from a storage medium.

2. Description of the Prior Art

In commercial photographic processing operations, very high rates of processing must be achieved and maintained in order to operate profitably. In order to permit efficient automatic processing, orders containing films of similar type and size are typically spliced together for developing. As many as 500 to 1,000 rolls of twelve, twenty, twenty-four and thirty-six exposure film of the same type and size may be spliced together for processing and printing purposes.

After developing, the photographic images contained in the film originals (generally negatives) are printed in an edge-to-edge relationship on a continuous strip of photosensitive paper by a photographic printer. The photographic printer causes high intensity light to be passed through the negative and imaged on the photographic print paper to expose the photographic emulsion layers of the paper. The print paper is subsequently processed to produce a print of the image contained in the negative.

This type of large-scale production is well suited to original or first-run production of photographic prints in which the film may be spliced to form a continuous roll. In the past, however, it has not been particularly well suited to production of reprints, where the customer has already received prints and has decided that he wishes to have additional prints made of certain negatives. Unlike first-run production, making of reprints has typically not been highly automated.

There are several reasons why reprints require special, less efficient handling. First, when reprints are ordered, the negatives generally have already been cut into short segments of three or four frames each, which are more difficult to handle than the longer film strips encountered in the first run production printing. Second, the customer may only desire reprints from one frame of a particular segment. This is unlike first-run production, in which a print is typically made from every printable negative on the strip. Third, often multiple prints rather than just a single print are desired from one or more negatives on a segment. Fourth, no extra non-printing area on the film is normally available to which a splice may be made. Fifth, reprints are requested from a much wider variety of film types than are typically encountered in first-run production. Sixth, color and/or density corrections may be required to produce a satisfactory print.

Because of these problems, making of reprints has often been handled on a manual or semi-automatic basis, and often on a different printer from the high speed first-run production printers on which it may be impossible to reproduce identical print color balance and density corrections. Also, dust and dirt from handling the negatives on a manual basis can degrade print quality. As a result, the quality of reprints often differs from first-run production prints. The lower quality of reprints in comparison to first-run production prints is a source of customer dissatisfaction.

In order to overcome some of the problems of making reprints, and to provide more efficient automated printing of reprints, systems have been developed in which the individual segments of negatives from which reprints are to be made are temporarily attached to a long paper strip or "tab". The "tabbing" of negatives to be reprinted is performed at a "preparation" or "order entry" station, where indicia (typically in the form of punched holes) are formed in the tab adjacent the frames of the negatives. These holes are used as frame location indicators and also provide frame status information. For example, in one system the number of holes may vary from one to four, with the first hole always indicating the frame location, while multiple holes provide the frame status information to allow the printer system to maintain synchronization of reprint data with the tabbed film material. In this system, two holes at a frame signify the end of a film strip, three holes at a frame signify the end of a customer order, and four holes at a frame indicate the end of a reel. In this type of system, a data entry device and a data storage device at the preparation station are used by the operator to store for each frame the number of holes in the tab, print quantity, density/color corrections, and setup number.

In a typical automated reprint system, a photographic printer includes sensors for sensing the indicia on the paper tab in order to sense the location of each frame to be printed. The data stored in the memory device for that particular frame is transferred to the photographic printer, and the required number of reprints, if any, from that frame are then produced.

One important requirement of this type of automated reprint system is that the data which is retrieved from the memory device correspond to the frame which is printed using that data. If loss of synchronization between the film advance and the data retrieval occurs, improper quantities of prints may be produced for all succeeding film frames. This can be extremely expensive both in terms of wasted materials and lost production time.

SUMMARY OF THE INVENTION

The photographic reprint system of the present invention uses first and second indicia sensor means to sense the indicia on the tab adjacent each film frame, and compares the sensor signals with the stored data which has been retrieved from that film frame. The first sensor means is positioned upstream of the print gate of the printer, while the second sensor means is located adjacent the print gate.

Even if the signals from the first sensor means disagree with the stored data, the film frame is still printed using the stored data, because there is a small but non-negligable probability of counting error by the first sensor means due to possible erratic tabbed film movement and other sources of error. Since the reprint system is intended to require minimum operator attention it is desirable to stop the printer only when a high probability of system error occurs. If the signals from the second sensor means also disagree with the stored data, further operation of the printer is inhibited, since the results of both comparisons indicate a high probability of a synchronization error. If, on the other hand, the signals from the second sensor means agree with the stored data, further operation of the printer is permitted.

By the use of two comparisons of the sensed indicia with the stored data, synchronization errors are positively identified. The operation of the reprint system is not interrupted unnecessarily, since the signals from both the first and second sensor means must disagree with the stored data to cause automatic operation of the printer to halt.

In one preferred embodiment, a limit is placed on the number of times the signals from the first sensor means may disagree with the stored data. If disagreement occurs too often, it indicates some malfunction or other condition which should be corrected by the operator before further automatic operation of the reprint system occurs. In that case, automatic operation is halted even if the signals from the second sensor means agree with the stored data.

BRIEF DESCRIPTION OF THE DRAWINGS

FIGS. 5A and 5B are an electrical block diagram of the photograhic printer of FIG. 3.

DETAILED DESCRIPTION OF THE PREFERRED EMBODIMENTS

Figure 1:
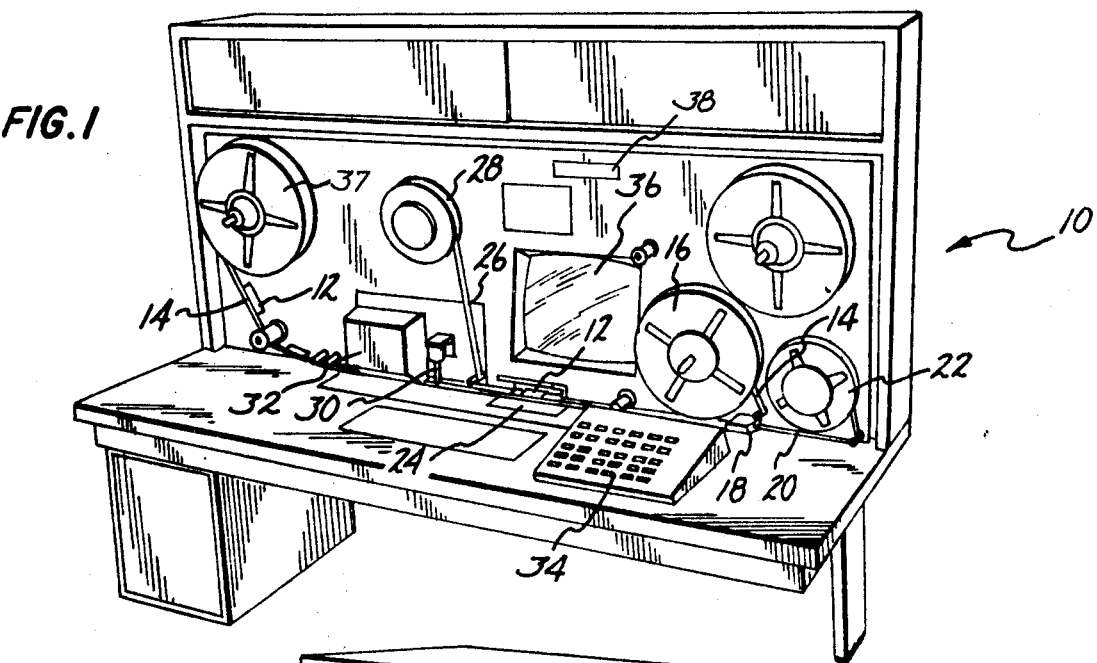
FIG. 1 is a perspective view showing the reprint film preparation station, at which strips or segments of films are attached to a paper tab, and at which data is stored relating to each frame.

FIG. 1 shows reprint film preparation station 10 at which segments of strips of photographic film 12 are attached to a paper strip or tab 14. As shown in FIG. 1, paper tab 14 is fed from reel 16 and under roller 18, where first transparent adhesive tape 20 is attached to the underside of tab 16. First tape 20 is supplied from reel 22, as shown in FIG. 1. The one edge of first tape 20 is exposed, and is used for attaching film segments 12 to paper tab 14 at mounting station 24. After film segments 12 are attached at mounting station 24, second transparent adhesive tape strip 26, which is fed from reel 28, is applied to the top surface of the junction between film segment 12 and paper tab 14. The use of first and second transparent tape strips 20 and 26 at top and bottom provides a more secure fastening of film segment 12 to paper tab 14.

After film segment 12 has been attached to paper tab 14, it advances to a marking station, at which punch holes are produced by paper punch 30. These holes are punched in paper tab 14 and indicate both the frame location and frame status information. A single hole punched in paper tab 14 indicates the location of a frame. Two holes at a frame signify both frame location and the end of a film segment. Three holes indicate a frame location, the end of a film segment, and the end of an order. Four holes indicate the location of a frame, the end of a film segment, the end of an order, and the end of the reel. Paper tab 14 and film segment 12 then advance to a paper printer 32, which prints human readable information on paper tab 14 adjacent the strip of a particular frame. In particular, paper printer 32 prints the order number adjacent the end of each order, the desired print quantity for each frame adjacent that frame, the total number of prints in each order at the end of each order, and other useful management information at the end and beginning of a reel.

Control of the operation of paper punch 30 and paper printer 32 is provided through data entry console 34. The operator of the preparation station enters, through console 34, information which is needed in the printing of prints from each frame. This information includes the end of strip, order or reel information which determines the number of holes which should be sensed in tab 14 adjacent the frame, print quantity for that frame, and density/color correction for that frame, and the color balance setup to be used in printing reprints from that frame. The information entered through console 34 is displayed on data display 35 and is stored on a memory medium, such as a floppy disk, in controller/disk drive 36.

As shown in FIG. 1, tab 14 with attached film segments 12 is wound onto take-up reel 37. Prior to printing, tab 14 and segments 12 preferably are rewound onto a supply reel of a printer.

Figure 2:
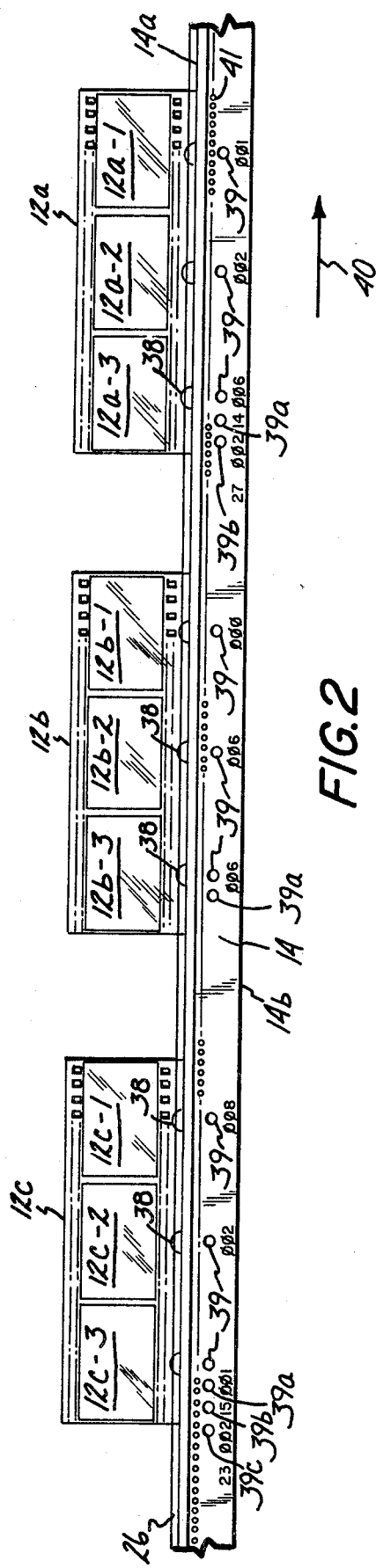
FIG. 2 shows a portion of paper tab with film segments attached.

FIG. 2 shows an example of a portion of paper tab 14 with three film strips or segments 12a, 12b and 12c attached. Segments 12a, 12b and 12c are 135 size photographic film, and each film segment includes three frames. The three frames of segment 12a are designated 12a-1, 12a-2, and 12a-3. Similarly, the three frames of segments 12b are designated 12b-1, 12b-2 and 12b-3, and the three frames of segment 12c are designated 12c-1, 12c-2 and 12c-3.

As shown in FIG. 2, segments 12a, 12b and 12c are attached to edge 14a of tab 14 by top layer of tape 26, and by bottom layer of tape 20 (not shown). The semicircular indexing holes or notches 38 characteristic of 135 size film are located near the edges of segments 12a, 12b and 12c which are closest to edge 14a of tab 14. Unlike first-run production printing, in this embodiment, notches 38 do not control the positioning of the individual film frames in the print gate of the printer. Instead, frame location is indicated by holes 39 in tab 14, which are located below the center of each frame. As will be discussed in detail later, the printer has sensors which sense holes 39 in order to properly position each frame in the print gate of the printer and to count the holes for synchronization purposes.

As shown in FIG. 2 below frame 12a-3 there are three holes 39, 39a and 39b. Hole 39 indicates frame location of frame 12a-3, and the presence of a total of three holes designates that this is the end of a segment and also the end of an order. Located below frame 12b-3 are two holes 39 and 39a. Once again, hole 39 indicates frame location of frame 12b-3, while the presence of two holes (39 and 39a) indicates that this frame is the final frame of segment 12b. Located below frame 12c-3 are four holes 39, 39a, 39b and 39c. Once again, hole 39 designates the frame location of frame 12c-3, while the additional holes 39a, 39b and 39c indicate that frame 12c-3 is at the end of the reel. In other words, there are no further segments attached to tab 14.

Arrow 40 shown in FIG. 2 indicates the direction of travel of the tab 14 and attached segments 12a, 12b and 12c when placed in a photographic printer. In the preparation station shown in FIG. 1, the direction of travel of tab 14 is from right to left, rather than from left to right. As a result, when segments 12a, 12b and 12c are initially attached at film preparation station 10, edge 14b of tab 14 is furthest from the operator, and edge 14a is closest to the operator.

As shown in FIG. 2, tab 14 also includes a longitudinal row of small holes 41 which are located above frame indicating holes 39. Holes 41 are indexing holes for tab 14 as it is advanced through the preparation station. Holes 41 are not used, however, during the photographic printing operation.

As shown in FIG. 2, certain information is printed on tab 14 near edge 14b. A three digit number is printed below each frame indicating hole 39. This three digit number, which can range from "000" to "999" indicates the desired print quantity from the frame indicated by frame indicating hole 39. In the example shown in FIG. 2, the desired print quantities for frame 12a-1 is "001", the desired print quantity for frame 12a-2 is "002", and the desired print quantity for frame 12a-3 is "006".

Generally below frame 12a-3 are a five digit number "00214" and a multiple digit number "27". The five digit number indicates the order number to which the preceding film segments belong. In the example shown, segment 12a, together with at least one other segment (not shown), form order number 214. The numeral "27" indicates that there were twenty-seven total prints in order number 214. The order number and the total number of prints are only printed on tab 14 when three or more holes are present.

Frames 12b and 12c form the next order, order number 215. In the example shown, frame 12b-1 has zero prints desired, frame 12b-2 has six prints desired, and frame 12b-3 also has six prints desired. In segment 12c, frame 12c-1 has a desired print quantity of eight, frame 12c-2 has a desired print quantity of two, and frame 12c-3 has a desired print quantity of one. Printed below holes 39b and 39c are the five digit number "00215" indicating that segments 12b and 12c form order number 215. The number "23" immediately to the left of the order number indicates that there are a total of twenty-three prints desired in order number 215.

In one typical embodiment, paper printer 32 also prints a variety of useful management information at the end of the tab after end of reel indicating hole 39c. This information (not shown in FIG. 2) may include, for example, the elapsed time in preparing the reel, the film size, the printer number, the total number of orders attached, the total number of prints requested, the operator number of the operator who prepared the tab and film segments, the total number of strips or segments attached, the floppy disk number, and the data of preparation.

Figure 3:
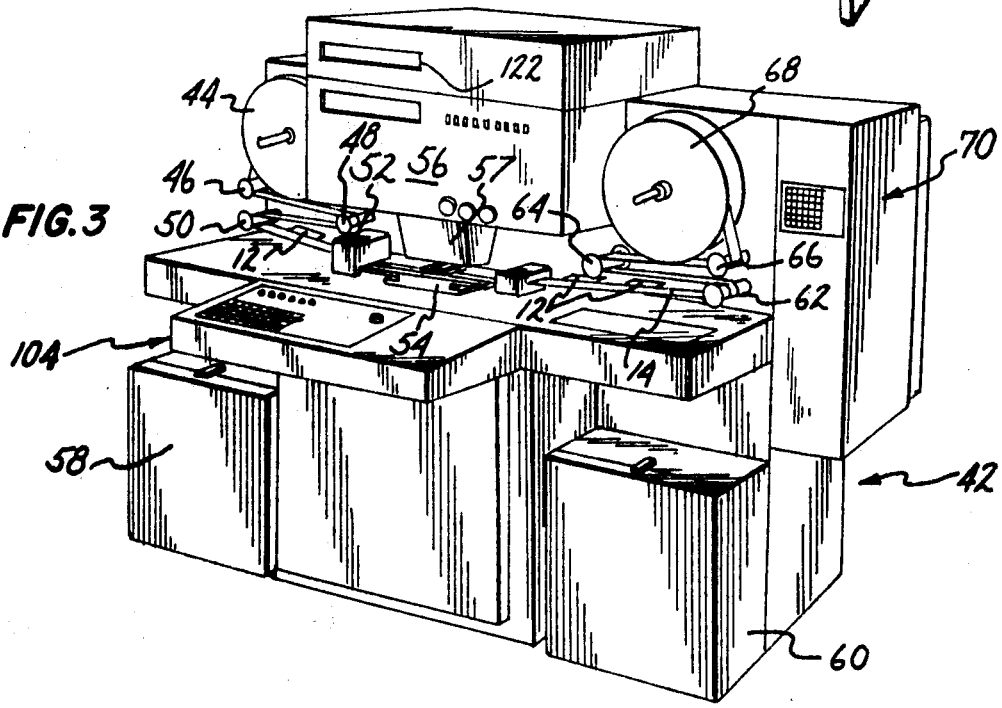
FIG. 3 is a perspective view of a photographic printer used in producing photograhic reprints.

FIG. 3 shows a photographic printer 42 which utilizes the present invention in producing reprints. In the printer 42 of FIG. 3, film segments 12 and paper tab 14 are supplied from supply reel 44 over stationary roller 46, bale arm 48, and stationary roller 50 to a film cleaning station 52, where the film segments 12 are cleaned prior to printing. Film segments 12 and paper tab 14 then advance to the neghold assembly 54, at which the frames are initially previewed by light sensors to determine whether automatic exposure corrections are necessary, and then are advanced to a print gate, where light from lamp house 56 and drop cone assembly 57 is passed downward through the negative to expose photosensitive print paper (not shown) located within printer 42. In FIG. 3, print paper is fed from a light-tight supply magazine 58, into printer 42 and onto a paper deck (not shown). After exposure, the print paper is fed out of printer 42 into light-tight takeup magazine 60. After the film segments 12 and paper tab 14 have passed the neghold station 54, they are advanced over stationary roller 62 and bale arm 64 and stationary roller 66 to takeup reel 68.

In the preferred embodiment of the present invention shown in FIG. 3, floppy disk drive/controller 70 is attached to printer 42. Floppy disk drive/controller 70 reads data from the floppy disk produced at preparation station 10 during the initial tabbing of the film.

Figure 4:
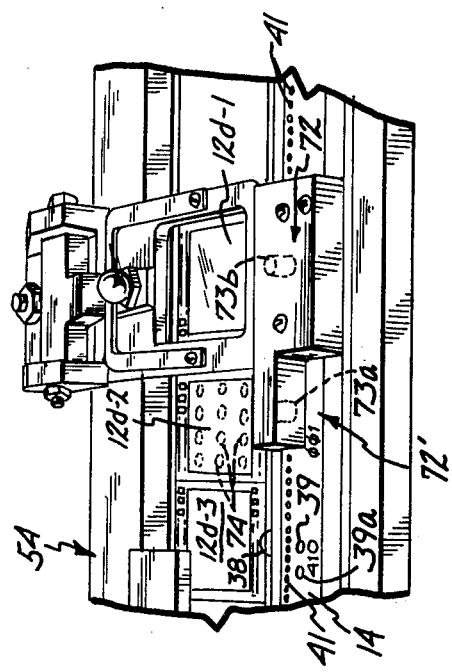
FIG. 4 is a perspective view of a portion of the neghold assembly of the photographic printer of FIG. 3.

FIG. 4 shows a portion of neghold assembly 54 of printer 42. In FIG. 4 a 135-size film segment 12d has a first frame 12d-1 located at the print gate, a second frame 12d-2 located at the preview gate of the neghold assembly, and a third frame 12d-3 upstream of the preview gate. Frame 12d-1 is in position for printing. Light is passed downward through frame 12d-1 and onto the photosensitive paper (not shown) located within printer 42.

Positioned below frame 12d-2 is an array of sensors 74 which measure density of frame 12d-2 at a plurality of locations. These sensor measurements will be used in determining need for and the amount of automatic exposure corrections required when printing frame 12d-2.

FIG. 4 also shows a housing 72 containing two light sources 73a and 73b (such as lamps or light emitting diodes) which are used in the sensing of the holes in paper tab 14. Two corresponding sensors (not shown in FIG. 4 but designated "102a and 102b" in FIG. 5a) are positioned below paper tab 14, opposite light source 73a and 73b, respectively. Sensor 102a is located adjacent the preview gate and sensor 102b is located adjacent the print gate. Sensor 102a signals the printer to take array density readings and also is utilized to count the number of holes per frame. Sensor 102b located adjacent the print gate signals the printer to stop the film feed because the frame is properly positioned at the print gate.

In a preferred embodiment of the present invention, the spacing of the preview gate and the print gate is essentially equal to the distance between adjacent frames of the film to be printed. The different film sizes, therefore, require different spacing between sensors 102a and 102b.

As shown in FIG. 4, housing 72 has a cut-away section 72' near the preview gate so that the print quantity, which is printed on the tab 14 as a three digit number, may be viewed while the frame is at the preview gate. In the example shown in FIG. 4, the three digit number "001" is visible, and indicates that the desired print quantity for frame 12d-2 is one.

Frame 12d-3 in FIG. 4 is the end of the strip, and therefore two holes 39 and 39a are located adjacent frame 12d-3. Frame indication hole 39 is aligned with the center of frame 12d-3, and end-of-strip hole 39a is immediately to the left of hole 39. The desired print quantity printed on tab 14 for frame 12d-3 is "410". In other words, the desired print quantity indicated is four hundred ten prints. As will be discussed in detail later this large desired print quantity causes printer 42 to stop and request verification by the operator before frame 12d-3 is printed. This gives the operator the opportunity to make certain that the number of prints requested is correct and to also check frame 12d-3 to be certain that it is in printable condition. In that way, large numbers of waste prints are avoided.

Figure 5A:
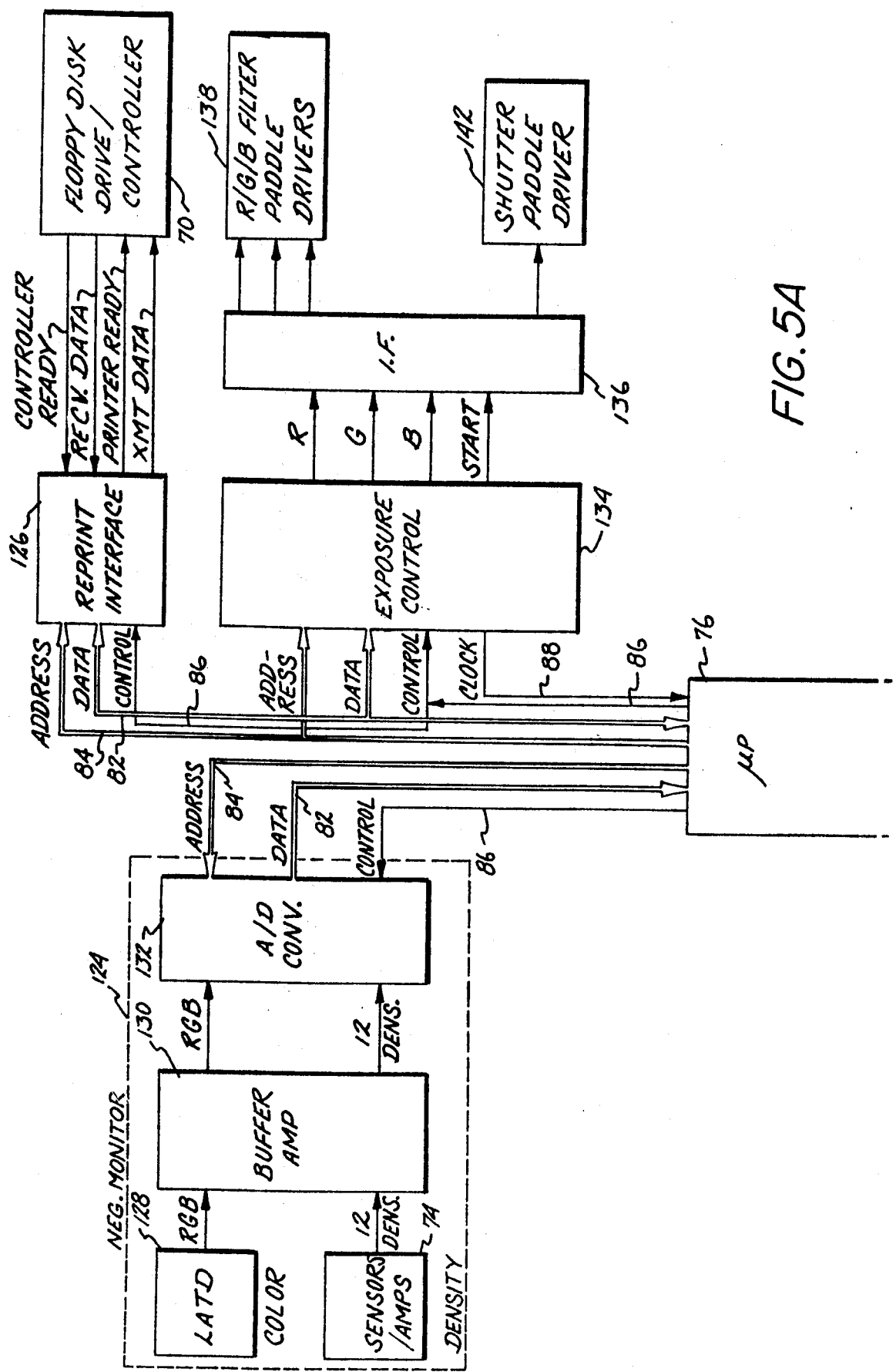

FIGS. 5A and 5B show an electrical block diagram of printer 42 shown in FIG. 2. Coordinating and controlling the operation of printer 42 is microprocessor 76, which in one preferred embodiment is an eight-bit microprocessor such as an Intel 8080A. Associated with microprocessor 76 are erasable programmable read only memory (EPROM) 78 and random access memory (RAM) 80. Microprocessor 76 communicates with the various portions of the control system through data bus 82, address bus 84, control bus 86, clock line 88, and interrupt lines 90.

In the embodiment shown in FIGS. 5A and 5B, microprocessor 76 directly controls the exposure control functions of the printer. In addition, microprocessor 76 coordinates the operation of paper feed control 92, film feed control 94, and cut/end-of-order punches 96 through control interface 98 and interface circuit 100. Input monitor signals are supplied to microprocessor 76, and output control signals are supplied to paper feed control 92, film feed control 94, and cut/end-of-order punches 96.

In the embodiments shown in FIGS. 5A and 5B, hole sensors 102a and 102b, which sense the punched holes in paper tab 14 at the preview and print gates, respectively, supply signals to microprocessor 76 through interface circuit 100, and control interface 98.

Figure 6:
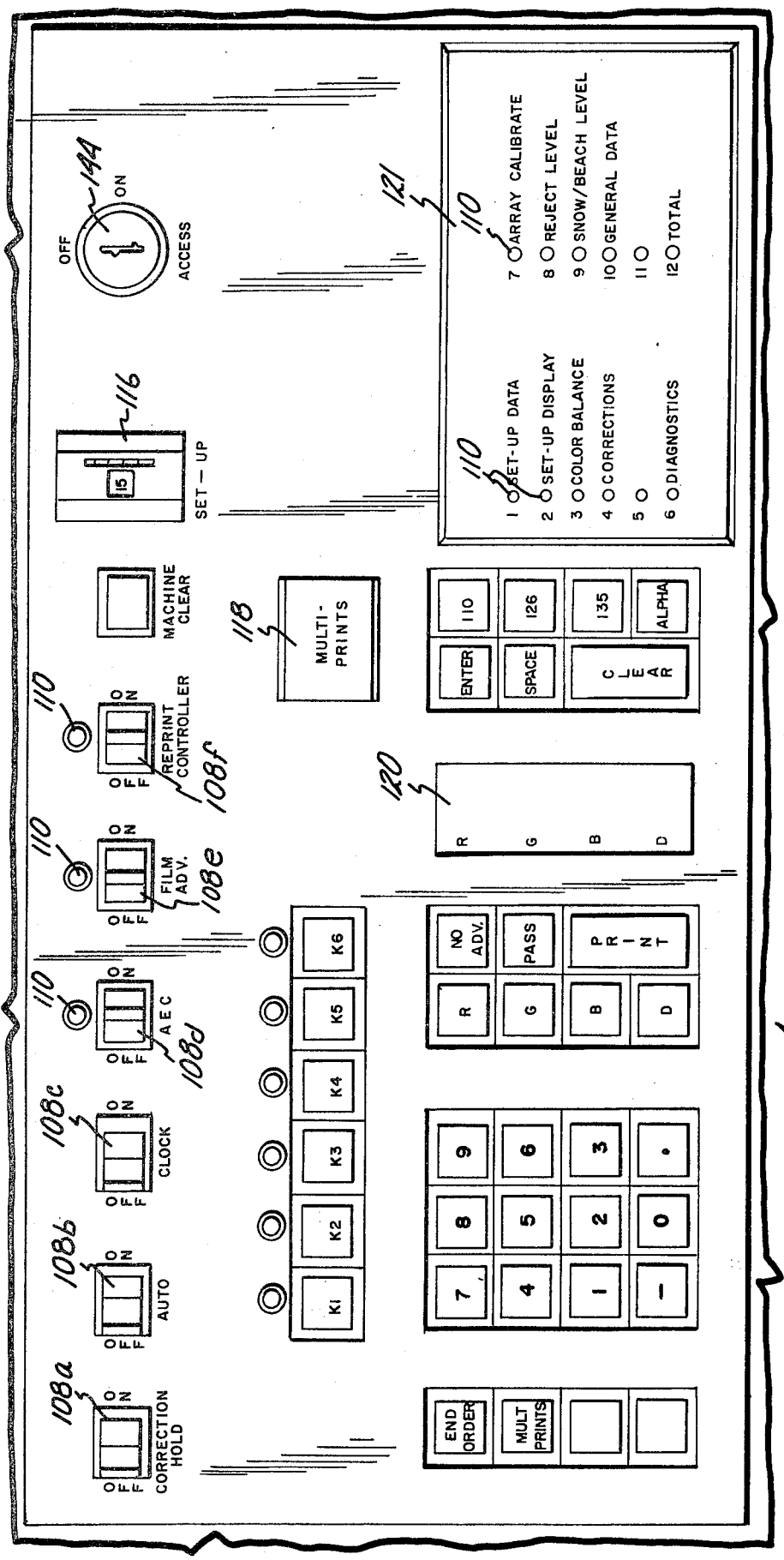
FIG. 6 is a view of the operator control panel of the photographic printer of FIG. 3.

Microprocessor 76 receives control information entered by the operator of printer 42 through control panel or console 104 (shown in FIG. 6). Console 104 includes a keyboard 106 through which the operator can enter a wide variety of alpha-numerical control information. Among the control information which is entered through keyboard 106 is red, green, blue and overall density button corrections entered by the operator. In preferred embodiments, color balance setup parameters, slope, gamma factors, and other exposure control parameters are also entered through keyboard matrix 106. As shown in FIG. 5A, function switches 108 are monitored by microprocessor 76 through keyboard matrix 106. Light emitting diodes 110 are associated with function switches 108 and keyboard matrix 106, and depending upon which function or functions are selected, microprocessor 76 energizes the appropriate light emitting diode or diodes.

Microprocessor 76 communicates with console 104 through control interface 98. Console data lines 112 and control lines 86 interconnect control interface 98 with control console logic 114. Signals to and from keyboard 106 are routed through control console logic 114. In addition to keyboard 106, control console logic 114 also is connected to setup select thumbwheel switches 116, two digit print quantity display 118, and eight digit display 120. Thumbwheel switches 116 are used both in the initial storage of color balance setup data in random access memory 80, and also during normal first-run production printing to select the setup. As will be discussed in detail later, during reprint operation, the selection of setup is provided by data stored on a floppy disk which is read by floppy disk drive/controller 70.

FIG. 6 shows a preferred embodiment of control panel or console 104. Keyboard matrix 106, shown in FIG. 5A, includes the following keys which are shown in FIG. 6: "END-OF-ORDER", "MULT PRINTS", "0" through "9", "-", ".", "R", "G", "B", "D", "NO ADV" (no advance), "PASS", "PRINT", "ENTER", "SPACE", "CLEAR", "110", "126", "135", "AL-PHA", "K1" through "K6", and "MACHINE CLEAR". Control console 104 also includes several function switches, including CORRECTION HOLD switch 108a, AUTO switch 108b, CLOCK switch 108c, AEC (automatic exposure correction) switch 108d, FILM ADVANCE switch 108e, and REPRINT CONTROLLER switch 108f, key-operated ACCESS switch 108g. SETUP thumbwheel switch 116, multiple print two-digit print quantity display 118, and eight-digit correction display 120 are also included on console 104. Key-operated ACCESS switch 108g, limits access to certain functions of the machine so that only the lab manager or another authorized person may alter certain critical operating parameters of the printer. Operation of ACCESS switch 108g is described in further detail in a co-pending patent application Ser. No. 867,897 by J. Pone, filed Jan. 9, 1978, and assigned to the same assignee as the present application.

Light emitting diodes 110 are located adjacent AEC switch 108d, FILM ADVANCE switch 108e, and REPRINT CONTROLLER switch 108f to indicate when the functions actuated by these switches are ON. Additional light emitting diodes 110 are located below a transparent function code plate 121 which has printed thereon the names of various functions or operating modes of the printer. Depending upon which function is selected, the light emitting diode 110 adjacent that function is energized, and shines through transparent plate 121.

Eight-digit display 120 displays the selected button corrections for red, green, blue and overall density. These button corrections have been entered through keyboard 106, or have been supplied from the floppy disk by controller 70, and microprocessor 76 provides the appropriate drive signals to display 120 through control interface 98 and control console logic 114.

In the embodiment shown in FIG. 5A, microprocessor 76 also controls display 122 through control interface 98. Display 122, which is also shown in FIG. 3, displays a wide variety of information of importance to the operator. For example, during initial color balancing display 122 displays instructions of the steps to be performed by the operator. In another mode, display 122 preferably displays current information as to stored parameters, and automatic corrections being used. During normal operation, in either the first run or reprint mode, display 122 displays setup number and name, or print exposure times, or error messages. As discussed later, one message displayed by display 122 indicates to the operator that the desired print quantity for the next frame to be printed exceeds a predetermined number.

Microprocessor 76 controls print exposures based upon stored data contained in EPROM 78, RAM 80, data received from control console logic 114, and sensor signals received from negative monitor circuitry 124 (FIG. 5B). In addition, when the printer is in the reprint mode of operation, additional data is received from floppy disk controller 70 through reprint interface circuit 126.

As shown in FIG. 5B, negative monitor circuitry 124 includes the density sensors 74, which provide measurement of density at a plurality of individual locations on the print. The signals from sensors 74 are produced when the negative is at the preview gate.

Negative monitor circuit 124 also includes large area transmission density (LATD) sensors 128, which provide red, green and blue LATD signals indicating the overall color content of the negative. LATD sensors 128 are located within the printer below the print gate.

Both the density signals from sensors 74 and the LATD signals from LATD sensors 128 are supplied to buffer amplifier circuit 130.

The LATD signals and the density signals are provided by buffer amplifier circuitry 130 to analog-to-digital converter 132. In a preferred embodiment, analog-to-digital converter 132 also includes multiplexers for multiplexing the twelve density sensor signals and multiplexing the three LATD signals. The signals are converted to digital signals, and are provided to microprocessor 76 over data bus 82.

Based upon the data which it receives, microprocessor 76 supplies data to exposure control 134. In one preferred embodiment, exposure control 134 is similar to the exposure control circuit shown in U.S. Pat. No. 4,140,391 by Laciak and Pone, which is assigned to the same assignee as the present application. Exposure control 134 supplies red, green, and blue exposure time control signals through interface circuit 136 to red, green, and blue filter paddle drivers 138. In addition, exposure control 134 supplies a start signal through interface circuit 136 to shutter paddle driver 142.

FIGS. 7A, 7B, 8 and 9 are operational diagrams illustrating the operation of the control system of the photographic printer of FIGS. 5A and 5B for both first run production operation and reprint operation. At the beginning of each cycle, the conditions are initialized, so that the system is ready for a print cycle. Microprocessor 76 determines whether printer 42 is in a first run production or a reprint mode. In a preferred embodiment, circuitry (not shown) associated with the first run and reprint negholds, together with reprint controller switch 108f, provides an indication of which mode is being used.

Before discussing the reprint mode, which utilizes the present invention, the first run production mode will be discussed. In this mode, after determining that the printer is in the first run production mode, microprocessor 76 interrogates control console logic 144 to determine all operator inputs to be used during the print cycle. In the embodiment shown in FIGS. 5A and 5B, these operator inputs include the setup number which is selected by thumbwheel switches 116. Random access memory 80 contains color balance setup data to be used for each of a plurality of color balance setups.

In one preferred embodiment of the present invention, the color balance setup data stored in random access memory 80 includes the following information: film size; the message to be displayed on alpha-numerical display 122; red, green and blue aim points; gamma factors; slope centers; over/under slope values; color balance factors; density and color button increments; temporary color/density corrections; array calibration data for each film size; over/under reject levels; snow/beach scene (SNRA) value; and totals of average print times, total prints, and number of film synch errors. Some of this setup data is described in further detail in the following patent and co-pending patent applications, all of which are assigned to the same assignee as the present application: U.S. Pat. Nos. 4,149,799 by J. Pone and P. Seidel; and 4,168,121 by J. Freier, R. Harvey and J. Pone; Ser. No. 848,739 by J. Pone, filed Nov. 4, 1977; Ser. No. 848,738 by J. Pone, filed Nov. 4, 1977; Ser. No. 862,733 by R. Laska, filed Dec. 21, 1977; and Ser. No. 867,897 by J. Pone, filed Jan. 9, 1978.

It should be understood, of course, that other information may be included within the color balance setup data stored. It should also be understood that in different photographic systems, not all of the information described above is stored as part of the color balance setup data includes at least some of the information listed above, or similar information used in controlling red, green and blue exposures for a particular film type.

Microprocessor 76 then applies any buttoning corrections entered through keyboard matrix 106 by means of the "R", "G", "B", "D", "0" through "9", "-" and "." keys. These corrections alter the exposures for any and all of the color channels.

The photographic film feed is then started. This causes the frame which has been at the preview gate to be advanced to the print gate. It is this frame which will be printed during the print cycle.

Microprocessor 76 then gets any automatic exposure correction data from array sensors 74, the measurements for which were taken as the frame to be printed passed by the sensor array 74 during this or some previous film movement. It then calculates the appropriate automatic exposure correction data which is used in providing corrections for certain types of printing failures. Microprocessor 76 then checks for film data sequence (i.e. "film synch") errors and sets the automatic exposure correction data to zero if errors are found to exist.

At this point the negative frame to be printed has advanced to the print gate hole 39, has been sensed by sensor 102b and tab 14, and film 12 has been stopped. Print light is permitted to pass through the negative frame, and red, green and blue LATD signals are obtained from LATD sensors 128. During this LATD measurement, the shutter paddle which is positioned between the negative print gate and the photographic print paper is in position, so that no light impinges upon the print paper.

Microprocessor 76 then calculates red, green and blue exposure times based upon the color balance setup information, the automatic exposure correction data, the buttoning corrections which have been entered by the operator (if AUTO switch 108b is off so that printer 42 is in manual, i.e. operator controlled operation), and the LATD signals. Based upon the calculated red, green and blue exposure times, microprocessor 76 controls, through exposure control 134 and interface 136, the red, green and blue filter paddle drivers 138, and shutter paddle driver 142. Calculation and control of exposure times in one preferred embodiment is described in further detail in previously mentioned U.S. Pat. Nos. 4,140,391 and 4,168,120. After the exposures of all three color channels have been completed, as indicated by the shutter paddle being driven into the light path, paper feed control 92 is actuated to complete the entire operational cycle. The cut/end-of-order punches have been actuated at the beginning of the exposure. Microprocessor 76 returns to its initial state, and waits for the next print cycle to be initiated.

Figure 7A:
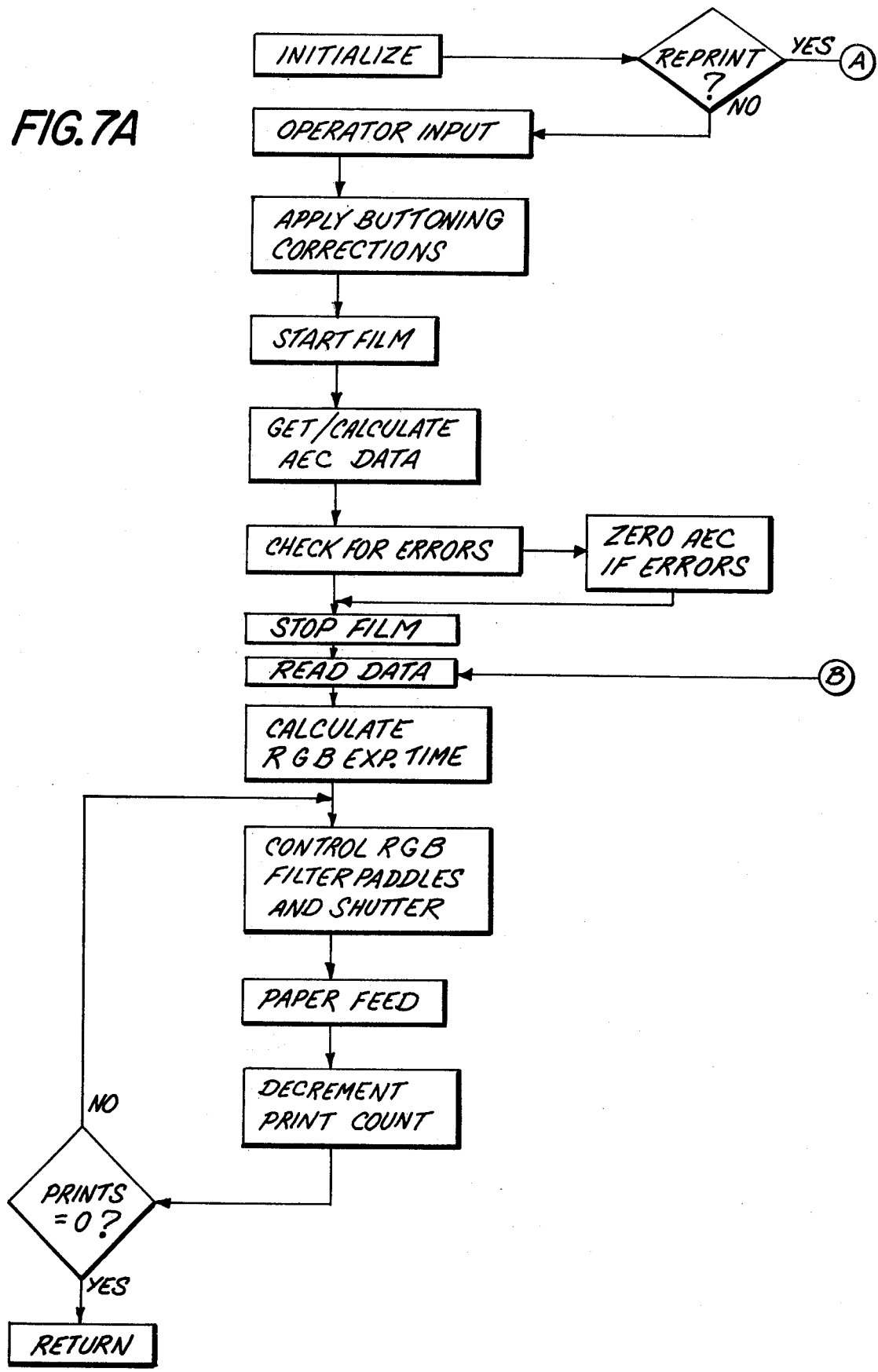
FIGS. 7A and 7B are flow diagrams of the operations performed by the photographic printer of FIG. 3 when producing reprints.
Figure 7B:
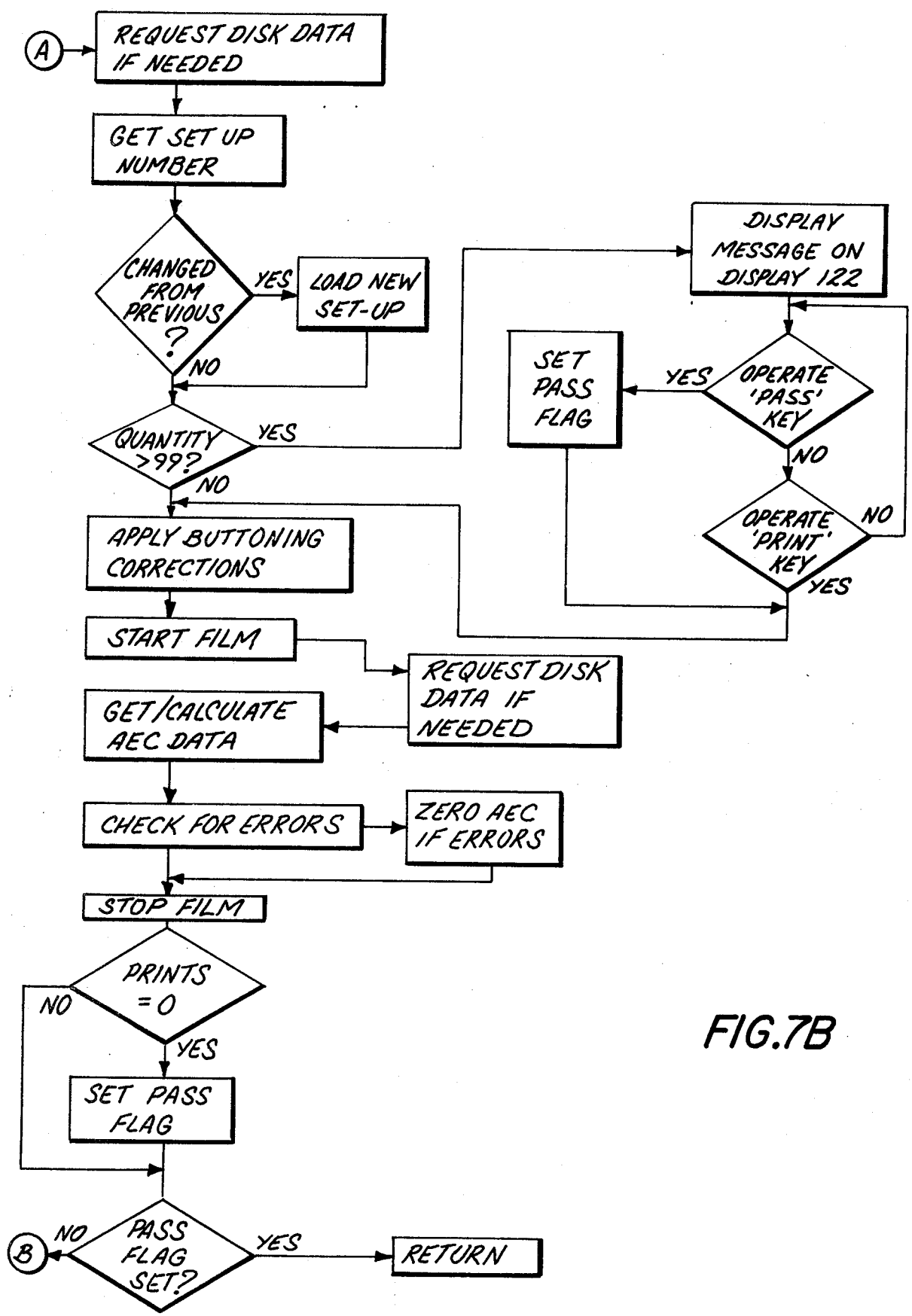

The operation of the printer system in the reprint mode is also shown in FIGS. 7A and 7B. In this mode, circuitry associated with neghold 54 indicates that the printer is in the reprint mode. During the first cycle of operation, microprocessor 76 requests data from floppy disk drive/controller 70 through reprint interface 126. In subsequent cycles, the disk data will already have been requested and will have been received by microprocessor 76 before the print cycle starts.

The disk data provided to microprocessor 76 from floppy disk drive/controller 70 includes the number of holes which should have been sensed for that frame, print quantity, density and color correction data, and setup number for the frame to be printed. The disk data may additionally provide a film size code for error checking purposes. Microprocessor 76 first gets the setup number which has been provided by floppy disk drive/controller 70 and determines whether this has changed from the previous cycle. If, the reprint system is in its first cycle, or if the setup number has changed from the previous frame which is printed, microprocessor 76 loads the new setup data which it retrieves from random access memory 80. This color balance setup data will be used in printing during this cycle. As a result, each negative frame is printed using the color balance setup which will provide best print quality. If further permits various strips of film of different film types but simlar size to be attached on a single tab 14, since printer 42 automatically selects the proper setup based upon the data supplied from floppy disk drive/controller 70 for that particular negative frame.

It can be seen, of course, that the setup number can be stored on the floppy disk for each frame, or can be stored only for each frame where a change in setup is required. In this latter case, microprocessor 76 assumes that no change in setup is required unless it receives a new setup number from floppy disk drive/controller 70.

As a precaution to avoid large quantities of waste prints, after the setup has been loaded, microprocessor 76 determines whether the desired print quantity exceeds a preset number (which in the embodiment shown is ninety-nine). If it does, microprocessor 76 causes a warning message to be displayed on display 122. After verifying the required quantity and film framing the operator may tell the printer to print that frame, to pass that frame without printing, or may modify the quantity or adjust film position, etc. before telling the printer to continue. However, as long as the quantity of prints requested is less than the preset number, microprocessor 76 continues with the reprint cycle, producing the requested quantity of prints.

FIGS. 7A and 7B show the operation of microprocessor 76 in detail with respect to the large print quantity protection. When the desired print quantity received from reprint controller 70 exceeds the preset number (such as 99), microprocessor 76 first causes a message to be displayed on display 122. Microprocessor 76 then monitors the status of the PASS and PRINT keys until one or the other of these keys is actuated by the operator. Automatic operation of the printer will not continue until one of these two keys is depressed. A more detailed description of this print quantity protection feature may be found in our co-pending application entitled "Photographic Reprint System with Large Print Quantity Vertification", filed on even data with this application and assigned to the same assignee.

The data received from floppy disk drive/controller 70 for the frame to be printed includes density and color correction data, which is typically in the form of desired buttoning corrections. These buttoning corrections are entered and calculated by microprocessor 76 for use in the reprint cycle instead of manually entered data from the control console.

Microprocessor 76 then starts the film advance by providing the proper outputs through control interface 98 and interface circuit 100 to film feed control 94. During the film advance, microprocessor 76 gets and calculates the automatic exposure correction data from sensors 74 and calculates the appropriate automatic exposure corrections. In addition, the signals from the hole sensor 102a as the tabbing material passes over it at the preview gate permit microprocessor 76 to count the number of holes per frame. (In the embodiment described above, a single hole indicates a frame, two holes at a frame signify the end of a strip, three holes at a frame indicate end of order, and four holes at a frame indicate end of reel.)

Also during the film advance, microprocessor 76 requests disk data for the next reprint cycle, if needed. This is based, of course, on the signals which have been received from hole sensor 102a. Signals from hole sensors 102a and 102b indicate to microprocessor 76 when the paper tab 14 and film 12 has advanced so that the next frame is aligned in the print gate.

Figure 8:
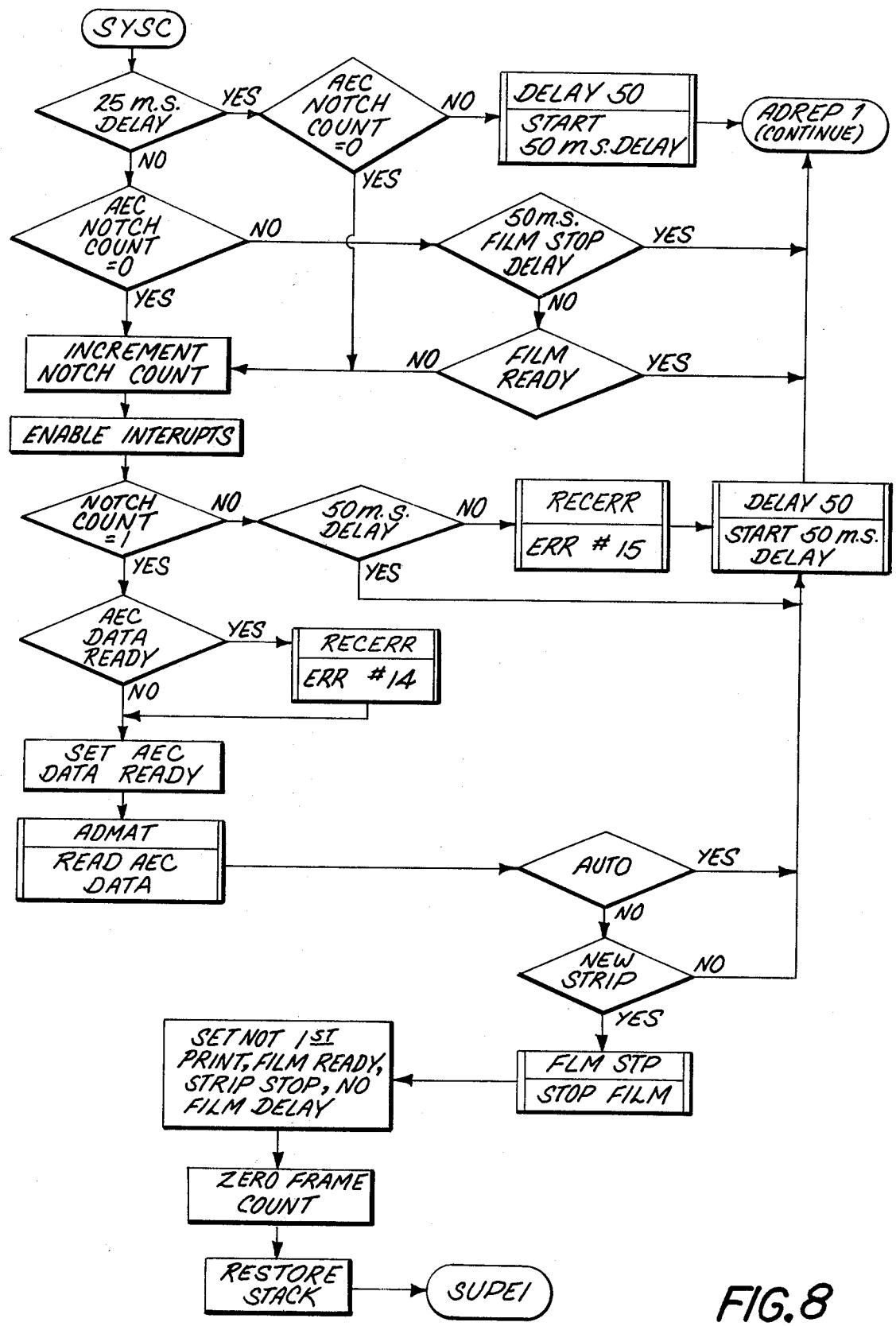
FIGS. 8 and 9 are flow diagrams of the operations performed during the AEC notch interrupt and print notch interrupt.
Figure 9:
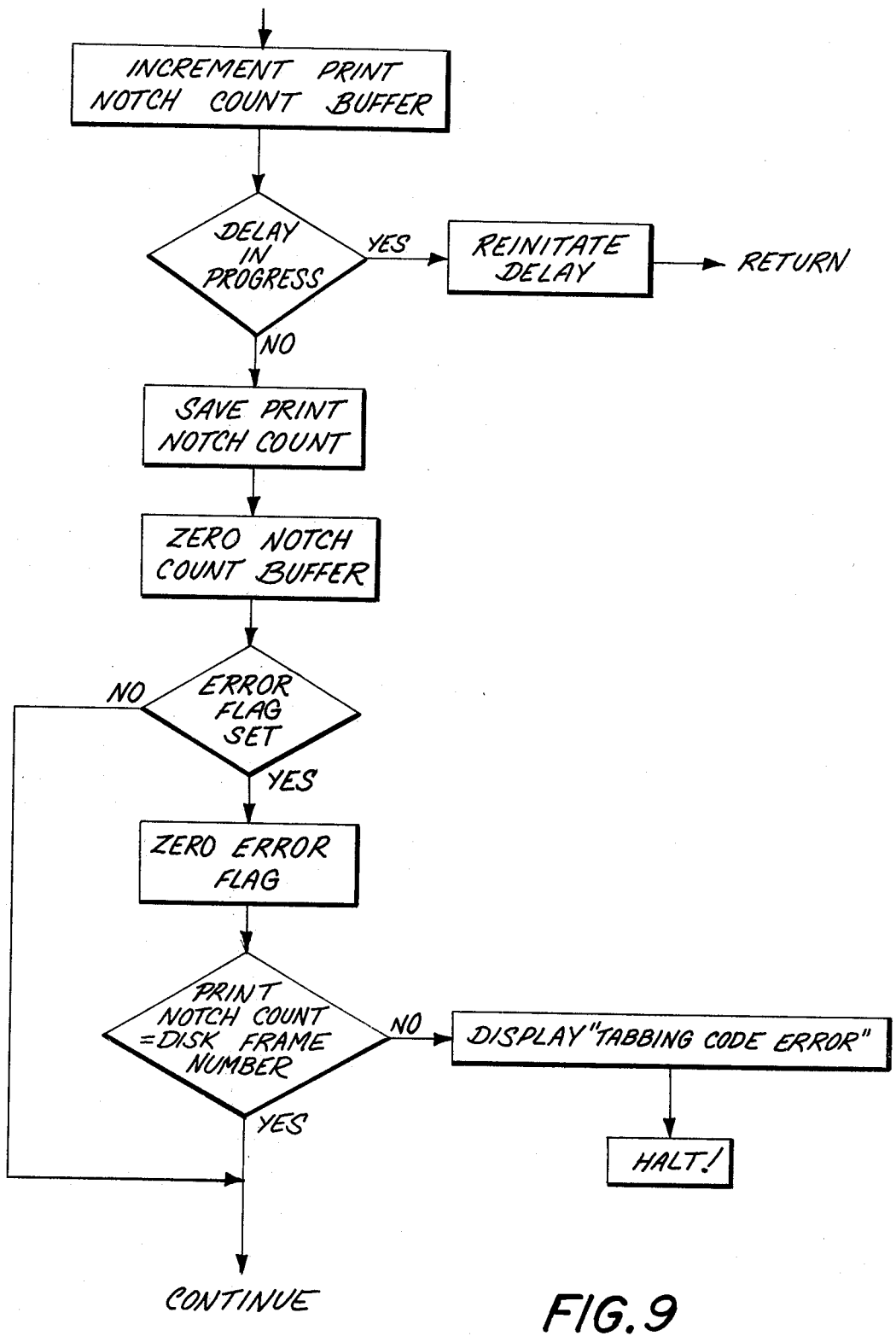

During the film advance, the sensing of holes in tab 16 by sensors 102a and 102b signals microprocessor 76 on an interrupt basis. In other words, each time the leading edge of a notch or hole is sensed by either sensor 102a of sensor 102b, an interrupt signal is supplied to microprocessor 76. This causes an interrupt routine to be performed. FIG. 8 shows the AEC notch interrupt routine, which is performed in response to an interrupt signal produced by sensor 102a adjacent the preview gate. FIG. 9 shows the print notch interrupt routine, which is performed in response to an interrupt signal produced by sensor 102a adjacent the preview gate.

As shown in FIG. 8, the first time that sensor 102a produces an interrupt signal, this will indicate that sensor 102a has sensed frame location hole 39 for the frame that is moving through the preview gate and into the print gate. It is the sensing of hole 39 which causes microprocessor 76 to read the AEC data from sensor array 74 and to initiate an AEC delay. The AEC delay ensures that the AEC data is calculated for a valid initial AEC notch. When sensor 102a senses the first hole 39, no AEC notch display has been previously initiated, the AEC count is zero, and the AEC delay is not completed, since it has not yet been initiated. Microprocessor 76, therefore, increments the AEC notch count, and since the AEC notch count now equals one, microprocessor 76 reads the AEC data from sensor array 74. Microprocessor 76 then initiates an AEC delay and continues its operation, waiting for the next interrupt signal. If one of these interrupts is to signify that the AEC delay has timed out, microprocessor 76 proceeds to calculate the AEC data. This operation continues until an interrupt signal is received from the print gate sensor 102b indicating that hole 39 has been sensed and the film is now in the print gate.

If there are more than one hole below the frame which is moving from the preview gate to the print gate, the AEC notch interrupt routine will be performed more than once, and the AEC count will be incremented each time an interrupt occurs and the AEC delay will be initiated again.

When an interrupt signal is received from hole sensor 102b indicating that frame location hole 39 has been sensed (as will be described later) the film 12 and tab 14 are stopped. Microprocessor 76 then compares the AEC count with the number which was received from the floppy disk for the frame which is now in the print gate. If the AEC count compares with the number of holes received from the disk, the printer continues with normal operation. If, on the other hand, the AEC count does not compare, microprocessor 76 sets a FIRST ERROR flag.

FIG. 9 shows the print notch interrupt routine which is also performed on an interrupt basis during the time period between the start of a film advance and the stopping of the film. When the film is first started, a print notch time delay is commenced during which time a print notch interrupt signal will not cause stopping of the film. This is necessary so that when multiple holes are located below a single frame, only the frame location hole 39 stops the film advance. The print notch time delay is long enough so that all of the remaining holes which might be below the frame moving out of the print gate will have passed sensor 102b before a print notch interrupt signal causes stopping of the film.

As shown in FIG. 9, each time a print notch interrupt is received, the print notch count buffer is incremented. As long as the print notch time delay is in progress, microprocessor 76 merely reinitiates the time delay and returns to its other operations. After the time delay is finally completed, the next hole sensed by sensor 102b is the frame location hole 39 for the frame which has moved into the print gate and is ready for printing. When hole 39 is sensed by sensor 102b, the print notch count is saved, and the notch count buffer is zeroed. Microprocessor 76 then checks whether the FIRST ERROR flag was set during the previous film advance and print cycle (i.e. the frame which has now moved out of the print gate). If this flag has not been set, operation continues as shown in FIGS. 7A and 7B. If, on the other hand, the FIRST ERROR flag is set, microprocessor 76 zeros the FIRST ERROR flag and checks whether the print notch count equals the number received from the floppy disk for the frame which was just advanced out of the print gate. If the print notch count and the number from the floppy disk correspond, operation is continued and the frame now in the print gate is printed. If, on the other hand, the print notch count does not correspond, then microprocessor 76 causes "Tabbing Code Error" to be displayed on display 122.

In other words, if the number of holes or notches counted by both the AEC hole sensor 102a and the print hole sensor 102b do not correspond to the number received from the disk, then further operation of the printer is halted. The disagreement between the holes counted and the number from the disk indicates that an error has occurred, and that the floppy disk is no longer synchronized with the film advance.

In one preferred embodiment of the present invention, the number of times the FIRST ERROR flag is set also is counted. A limit is placed on the number of times that the FIRST ERROR flag is set (i.e. the number of times the AEC notch count disagrees with the disk number). If disagreement occurs too often, it indicates some malfunction or other condition which should be corrected by the operator before further operation of the reprint system occurs. In one embodiment, the occurrence of more than one disagreement between the AEC notch count and the disk data within any order results in the printer being halted and display 122 displaying the "Tabbing Code Error" message.

Microprocessor 76 checks the print quantity and sets the PASS flag if the print quantity is zero. Microprocessor 76 then checks to see whether the PASS flag is set. The PASS flag may have been set either by the operator depressing the PASS key as illustrated in FIG. 7B, or because the print quantity is zero as described above. In either case, microprocessor 76 returns to the beginning of operation without making any prints from the film frame then in the print gate.

If the PASS flag is not set, the reprint cycle then becomes the same as a first run production cycle. LATD measurements are made; red, green and blue exposure times are calculated; and red, green and blue filter paddles and the shutter paddle are controlled by microprocessor 76 to produce a print of the film frame in the print gate.

At the end of an exposure cycle a paper feed is initiated, and microprocessor 76 decrements the print count and checks to see if the print count is zero. If it is not zero, microprocessor 76 commences another exposure cycle by controlling the red, green and blue filter paddles and the shutter. In the embodiment shown in FIG. 7A microprocessor 76 does not recalculate exposure times in the case of multiple prints, but rather uses the previously calculated exposure times for each of the multiple print cycles. When the print count is finally decremented to zero, microprocessor 76 returns to the beginning of the operation. If the printer is operating in the automatic reprint mode, the next complete operational cycle is then automatically initiated.

In conclusion, the synchronization recovery of the present invention, therefore, prevents unnecessary halting of the operation of the reprint system. Where interruption of the automatic operation is necessary, the AEC notch count and the print notch count will both disagree with the stored data from the floppy disk, and halting of the operation of the system in that event is appropriate.

Although the present invention has been described with reference to preferred embodiments, workers skilled in the art will recognize that changes may be made in form and detail without departing from the scope of the invention.

What is claimed is:

1. A photographic reprint system in which photographic prints are produced from film frames of film segments which are attached to an elongated tab, the tab having holes therein proximate each film frame to be printed, the improvement comprising:
   storage means for storing information for each film frame being printed, the information including the number of holes in the tab adjacent the film frame;
   a print gate at which light is directed through a film frame to expose a photosensitive medium;
   means for sequentially advancing the film frames and tab to the print gate;

means for sequentially retrieving the stored information including the number of holes;

first sensor means for sensing the holes in the tab, the first sensor means being located upstream of the print gate;

second sensor means for sensing the holes in the tab, the second sensor means being located adjacent the print gate.

means for comparing the number of holes sensed by the first sensor means with the stored number of holes;

means for printing the film frame based upon the stored information;

means for comparing the number of holes sensed by the second sensor means with the stored number of holes; and means for inhibiting further operation of the printer means if the number of holes sensed by both the first sensor means and the second sensor means disagree with the stored number of holes.

2. The invention of claim 1 and further comprising:

means for inhibiting further operation of the printer system if the number of holes sensed by the first sensor means disagrees with the number of stored holes more than a predetermined number of times within a predetermined time period.

3. The invention of claim 2 wherein the predetermined period is each customer order.

4. The invention of claim 1 wherein the stored information further includes exposure corrections to be used in printing the film frame.

5. A method of printing photographic prints from photographic film, the method comprising:

attaching photographic film segments to an elongated tab;

providing indicia on the tab associated with each film frame to be printed;

storing information for each film frame, the information including the indicia on the tab associated with the film frame;

advancing the tab with attached film segments along a path to a print gate at which the film frames are printed;

sensing indicia on the tab at a first location prior to the print gate;

sequentially retrieving the stored information;

comparing the indicia sensed at the first location with the information retrieved;

advancing the film frame and tab to the print gate;

printing the film frame regardless of whether the indicia sensed at the first location agrees with the information retrieved;

sensing the indicia on the tab at a second location adjacent the print gate; and halting further printing if the indicia sensed at the first location and the indicia sensed at the second location both disagree with the information retrieved; and permitting the next film frame to be printed if the indicia sensed at the second location agrees with the information retrieved even though the indicia sensed at the first location disagrees with the information retrieved.

6. The method of claim 5 inhibiting further printing if the indicia sensed at the first location disagrees with the information retrieved more than a predetermined number of times within a predetermined period.

7. The method of claim 6 wherein the predetermined period is each customer order.

8. In a photographic reprint system in which photographic prints are produced from film frames of film segments which are attached to an elongated tab, the tab having one or more longitudinally spaced holes proximate each film frame, one of the holes indicating the location of the film frame and the number of holes indicating frame status, the improvement comprising:

storage means for storing information for each film frame wherein the stored information includes the number of holes in the tab adjacent the film frame;

means for sequentially advancing the film frames and tab along a film path, the means initiating a film advancement in response to an initiate signal and halting the film advancement as a function of a halt signal;

optical sensor means positioned along the film path for making optical measurements of the film frames;

a print gate at which light is directed through a film frame to expose a photosensitive medium, wherein the print gate is located along the film path downstream from the optical sensor means;

means for sequentially retrieving the stored information for the film frame to be printed at the print gate, including the number of holes in the tab adjacent the film frame;

first hole sensor means positioned proximate the optical sensor means for sensing holes in the tab and providing first hole sensor signals for each hole sensed;

second hole sensor means positioned proximate the print gate for sensing holes in the tab and providing second hole sensor signals for each hole sensed;

means for providing the initiate signal to initiate a film advancement;

means for enabling the optical sensor means in response to one of the first hole sensor signals provided after a film advancement is initiated;

first counting means for receiving the first hole sensor signals and counting the number of holes sensed by the first hole sensor during a film advancement;

second counting means for counting the number of holes sensed by the second hole sensor during a film advancement;

means for inhibiting further operation if the number of holes counted by the first counting means and the number of holes counted by the second counting means both disagree with the stored number of holes; and means for receiving signals from the second hole sensor for providing the halt signal upon receipt of a second hole sensor signal only after a predetermined interval after initiation of a film feed.

9. The invention of claim 8 wherein the optical sensor means and the print gate are spaced essentially one film frame distance apart.

10. The invention of claim 9 wherein the stored information further includes exposure corrections for the film frame.

* * * * *